United States Patent
Durali et al.

(10) Patent No.: US 12,328,032 B2
(45) Date of Patent: Jun. 10, 2025

(54) MODULAR AXIAL FLUX MOTOR

(71) Applicants: Mohammad Durali, Tehran (IR); Ali Nickandish, Tehran (IR)

(72) Inventors: Mohammad Durali, Tehran (IR); Ali Nickandish, Tehran (IR)

(73) Assignees: Durali System Design & Automation Co. (IR); Sharif University of Technology (IR)

( * ) Notice: Subject to any disclaimer, the term of this patent is extended or adjusted under 35 U.S.C. 154(b) by 310 days.

(21) Appl. No.: 18/075,486

(22) Filed: Dec. 6, 2022

(65) Prior Publication Data

US 2023/0103227 A1 Mar. 30, 2023

Related U.S. Application Data

(60) Provisional application No. 63/286,109, filed on Dec. 6, 2021.

(51) Int. Cl.
| | |
|---|---|
| *H02K 1/18* | (2006.01) |
| *H02K 1/14* | (2006.01) |
| *H02K 1/2795* | (2022.01) |
| *H02K 3/52* | (2006.01) |
| *H02K 21/24* | (2006.01) |

(52) U.S. Cl.
CPC ............ *H02K 1/182* (2013.01); *H02K 1/148* (2013.01); *H02K 3/521* (2013.01); *H02K 21/24* (2013.01); *H02K 1/2795* (2022.01); *H02K 2203/12* (2013.01); *H02K 2213/12* (2013.01)

(58) Field of Classification Search
CPC ........ H02K 1/148; H02K 1/182; H02K 3/521; H02K 1/2793; H02K 2203/12
USPC .............. 310/156.32, 216.083, 216.058, 194
See application file for complete search history.

(56) References Cited

U.S. PATENT DOCUMENTS

| | | | | |
|---|---|---|---|---|
| 2006/0131985 A1* | 6/2006 | Qu | ............................ | H02K 1/18 290/44 |
| 2009/0140526 A1* | 6/2009 | Jansen | .................... | H02K 16/02 310/156.01 |
| 2012/0126653 A1* | 5/2012 | Yang | ....................... | H02K 1/146 310/156.32 |

(Continued)

FOREIGN PATENT DOCUMENTS

| | | | | |
|---|---|---|---|---|
| CN | 104779752 A | * | 7/2015 | ............. H02K 15/02 |
| CN | 111864933 A | * | 10/2020 | ............. H02K 1/165 |
| KR | 20050000245 A | * | 1/2005 | ............... H02K 1/18 |

OTHER PUBLICATIONS

Translation of KR 20050000245 A (Year: 2005).*
Translation of CN 104779752 A (Year: 2015).*
Translation of CN 111864933 A (Year: 2020).*

*Primary Examiner* — Michael Andrews
*Assistant Examiner* — Daniel K Schlak

(57) ABSTRACT

Disclosed herein is an axial flux motor. The axial flux motor includes a rotating shaft, a rotor assembly, and a stator assembly. The rotor assembly includes a rotor disc, a plurality of rotor disc teeth provided on a first side of the rotor disc, and a cage. The stator assembly includes a stator base, a plurality of electromagnet assemblies, a supporting plate, and a bearing housing. An electromagnet assembly from the plurality of electromagnet assemblies comprising a core, a first fixture, a second fixture, a coil winding, and a couple of connecting screws. The yoke is configured to be secured between the first fixture and the second fixture.

11 Claims, 17 Drawing Sheets

(56) References Cited

U.S. PATENT DOCUMENTS

| | | | |
|---|---|---|---|
| 2015/0001979 A1* | 1/2015 | Deguchi | H02K 21/24 |
| | | | 310/156.37 |
| 2017/0155297 A1* | 6/2017 | Tokoi | H02K 21/24 |
| 2018/0323663 A1* | 11/2018 | Ogawa | H02K 15/085 |
| 2019/0252930 A1* | 8/2019 | Stetina | H02K 3/522 |
| 2020/0067391 A1* | 2/2020 | Sandner | H02K 1/182 |
| 2020/0328634 A1* | 10/2020 | Mihaila | H02K 15/022 |
| 2021/0044162 A1* | 2/2021 | Maruyama | H02K 1/12 |
| 2021/0344237 A1* | 11/2021 | Nakamura | H02K 21/24 |
| 2022/0224183 A1* | 7/2022 | Lee | H02K 3/522 |
| 2024/0106285 A1* | 3/2024 | Lee | H02K 15/12 |
| 2025/0038605 A1* | 1/2025 | Hatch | H02K 15/095 |

* cited by examiner

104

151

1622

16222
16224

802

802

8222

MODULAR AXIAL FLUX MOTOR

CROSS-REFERENCE TO RELATED APPLICATION

This application claims the benefit of priority from U.S. Provisional patent application Ser. No. 63/286,109, filed on Dec. 6, 2021, and entitled "MODULAR AXIAL FLUX MOTOR" which is incorporated herein by reference in its entirety.

TECHNICAL FIELD

This disclosure generally relates to electrical motors and, particularly, relates to axial flux electric motors.

BACKGROUND

One of many applications for an electric motor is to operate different mechanical and electrical systems such as a pump or electrical vehicles. In these applications, an electric motor may be used to rotate an impeller within a pump or wheels in a vehicle, which may displace a fluid, causing a fluid flow or move a vehicle. Furthermore, many gas burning appliances include an electric motor, for example, water heaters, boilers, pool heaters, space heaters, furnaces, and radiant heaters. In some examples, an electric motor may power a blower that moves air or a fuel/mixture through the appliance. In other examples, an electric motor may power a blower that distributes air output from the appliance.

A common motor used in such systems is an alternating current (AC) induction motor. Typically, the AC induction motor is a radial flux motor, where the flux extends radially from the axis of rotation. Another type of motor that may be used in different applications is an electronically commutated motor (ECM). ECMs may include, but are not limited to, brushless direct current (BLDC) motors, permanent magnet alternating current (PMAC) motors, and variable reluctance motors. Typically, these motors may provide higher electrical efficiency than an AC induction motor. There is another type of motors that have an axial flux configuration in which the flux in the air gap extends in a direction parallel to the axis of rotation of the rotor. These motors are called axial flux motors.

An axial flux motor (also known as an axial gap motor, or pancake motor) is a geometry of electric motor construction where the gap between the rotor and stator, and therefore the direction of magnetic flux between the two, is aligned parallel with the axis of rotation, rather than radially as with the concentric cylindrical geometry of the more common radial gap motor. Although this geometry has been used since the first electromagnetic motors were developed, its usage was rare due to the manufacturing complicity. In recent years, the developments in manufacturing process, attracts attention of researchers and manufacturer.

Axial geometry may be applied almost any operating principle (e.g. brushed DC, induction, stepper, reluctance) that may be used in a radial motor. Even within the same electrical operating principle, different application and design considerations can make one geometry more suitable than the other. Axial geometries may allow some magnetic topologies that may not be practical in a radial geometry. Furthermore, axial flux motors have higher efficiency and power density than common radial flux motors.

However, axial flux motors may have some issues. For example, difficulties in their manufacturing have limited the development of these motors. One of the main difficulties in manufacturing an axial flux motor is the manufacturing of a stator that is to be used as a part of the axial flux motor. There is, therefore, a need for an axial flux motor that its stator may be manufactured and assembled in an easy and cost-effective way.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary axial flux motor. In an exemplary embodiment, the axial flux motor may include a rotating shaft, a rotor assembly, and a stator assembly. In an exemplary embodiment, the rotating shaft may be configured to rotate around a first axis. In an exemplary embodiment, the first axis may coincide a main longitudinal axis of the rotating shaft.

In an exemplary embodiment, the rotor assembly may be mounted fixedly onto the rotating shaft. In an exemplary embodiment, the rotor assembly may be configured to rotate around the first axis. In an exemplary embodiment, the rotor assembly may include a rotor disc and an electrical cage in induction motors or a plurality of permanent magnets in synchronous motors. In an exemplary embodiment, the plurality of permanent magnets may be attached onto a first side of the rotor disc.

In an exemplary embodiment, the stator assembly may be mounted on the supporting plate. In an exemplary embodiment, the stator assembly may include a stator base, a plurality of electromagnet assemblies, a supporting plate, and a bearing housing.

In an exemplary embodiment, the stator base may include a yoke, an outer fixture and an inner fixture. In an exemplary embodiment, the yoke may have a ring shape that is an electrical steel belt that is wound around its inner diameter. In an exemplary embodiment, the outer fixture may have a ring shape. In an exemplary embodiment, an inner diameter of the outer fixture may correspond to an outer diameter of the yoke.

In an exemplary embodiment, the outer fixture may include a plurality of teeth and a plurality of intercostal spaces. In an exemplary embodiment, the plurality of teeth and the plurality of intercostal spaces may be arranged alternately on a first side of the outer fixture. In an exemplary embodiment, the first securing part may be configured to be secured inside an intercostal space from the plurality of intercostal spaces.

In an exemplary embodiment, the inner fixture may have a ring shape. In an exemplary embodiment, an outer diameter of the inner fixture may correspond to an inner diameter of the yoke. In an exemplary embodiment, the inner fixture may be secured inside the yoke. In an exemplary embodiment, the second securing part may be attached to the inner fixture by utilizing a screw.

In an exemplary embodiment, the plurality of electromagnet assemblies may be attached onto a first side of the yoke. In an exemplary embodiment, the first side of the yoke may face toward the first side of the rotor disc. In an exemplary embodiment, the plurality of electromagnet assemblies may be configured to urge the rotor assembly to rotate around the first axis due to the created rotating magnetic field with the plurality of electromagnet assemblies and its interaction with the rotor assembly.

In an exemplary embodiment, an electromagnet assembly from the plurality of electromagnet assemblies may include a core, a first fixture, a second fixture, a coil winding, and a couple of connecting screws. In an exemplary embodiment, the core may include a plurality of core layers stacked onto each other.

In an exemplary embodiment, the first fixture may be attached to a first end of the core. In an exemplary embodiment, the first fixture may include a first securing part at one end of the first fixture. In an exemplary embodiment, the second fixture may be attached to a second end of the core. In an exemplary embodiment, the second fixture may include a second securing part at one end of the second fixture.

In an exemplary embodiment, the coil winding may be wound around the plurality of core layers, the first fixture, and the second fixture. In an exemplary embodiment, the couple of connecting screws may be configured to secure the plurality of core layers between the first fixture and the second fixture responsive to the couple of connecting screws being fastened into the first fixture and the second fixture.

In an exemplary embodiment, the yoke is configured to be secured between the first fixture and the second fixture. In an exemplary embodiment, the inner fixture, and the outer fixture attached to a first side of the supporting plate. In an exemplary embodiment, the bearing housing may be mounted on the supporting plate. In an exemplary embodiment, the couple of bearings may be disposed between the rotating shaft and the bearing housing.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
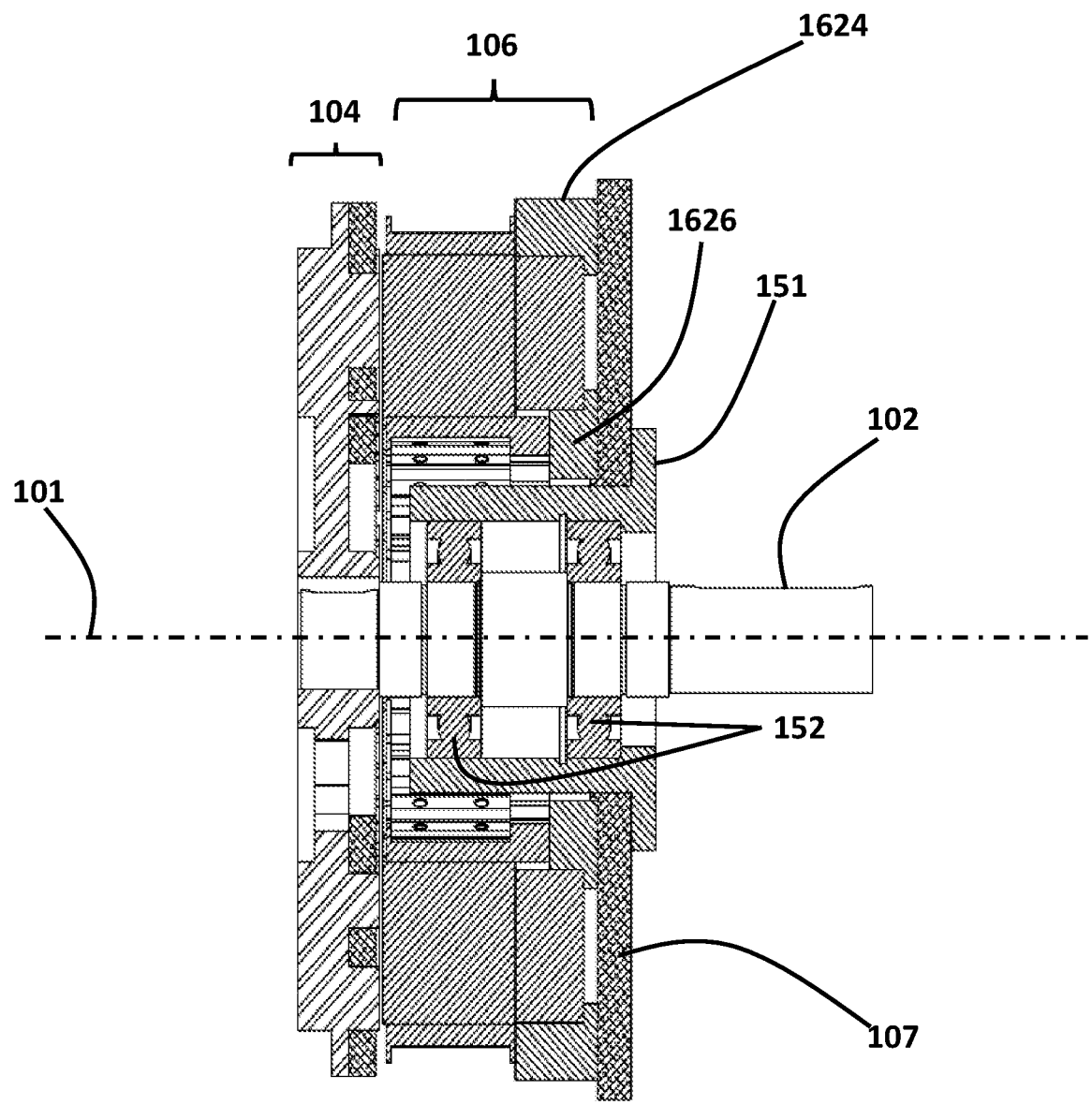
FIG. 1A illustrates a section view of an axial flux motor, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Disclosed herein is an axial flux motor. An exemplary axial flux motor may include a rotating shaft, a rotor assembly, and a stator assembly. The rotor assembly may be mounted fixedly onto the rotating shaft. The stator assembly may be attached to a base plate and mounted freely onto the rotating shaft. The stator assembly may include a plurality of electromagnet assemblies and the rotor assembly may include a plurality of rotor disc teeth. A rotating magnetic field may be created with the plurality of electromagnet assemblies similar to common radial flux motors and this rotating magnetic field may urge the rotor assembly and the rotating shaft to rotate around a main longitudinal axis of the rotating haft.

The stator assembly may include a stator base and a plurality of electromagnet assemblies. The stator base may include a yoke which may be secured between an inner fixture and an outer fixture. The plurality of electromagnet assemblies may be mounted onto the yoke. Each electromagnetic assembly may include a core which may be secured between a first fixture and a second fixture. The core may include a plurality of layers stacked onto each other. The electromagnetic assembly may also include a coil winding wound around the core, the first fixture, and the second fixture. The outer fixture may include a plurality of teeth and a plurality of intercostal spaces arranged alternately on the outer fixture. The electromagnet assembly may be mounted onto the yoke in such a way that a part of the first fixture is disposed in one of the plurality of teeth. The disclosed motor may be a modular axial flux motor with a rotor and stator facing toward each other.

Figure 1B:
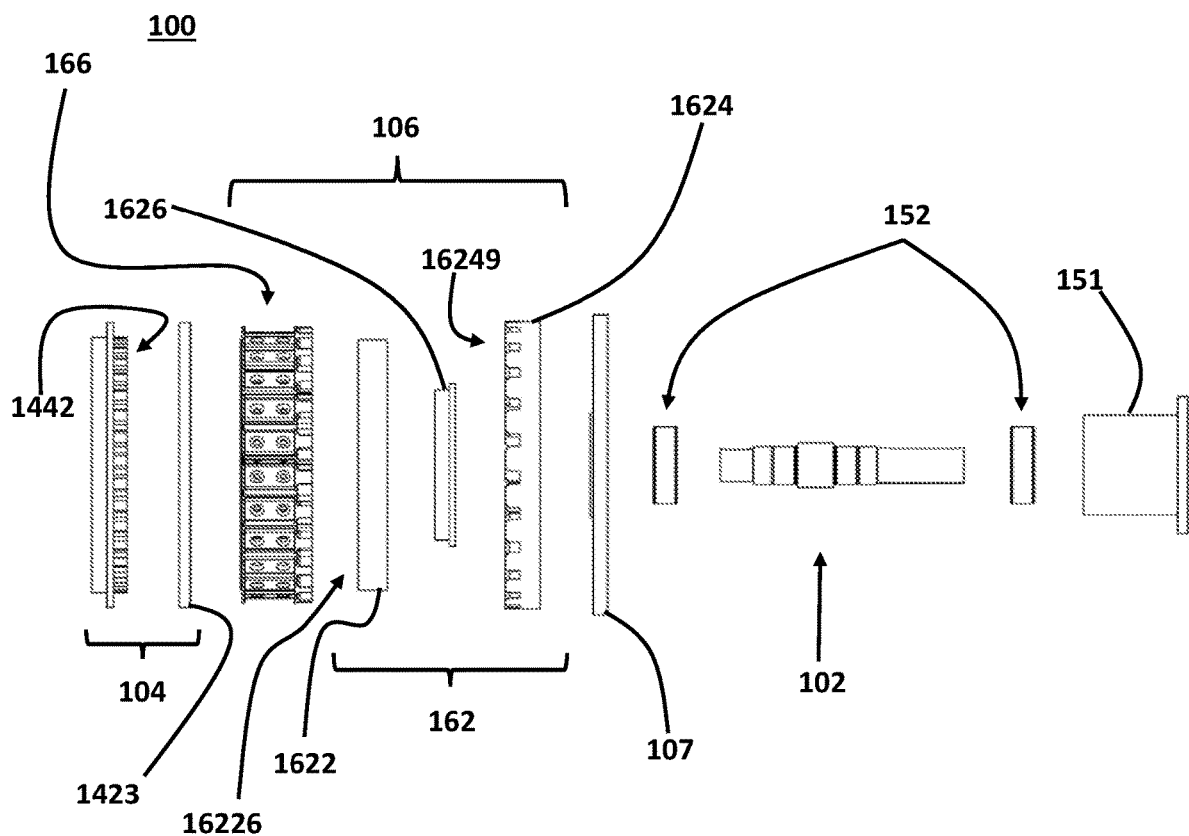
FIG. 1B illustrates an exploded view of an axial flux motor, consistent with one or more exemplary embodiments of the present disclosure.
Figure 2:
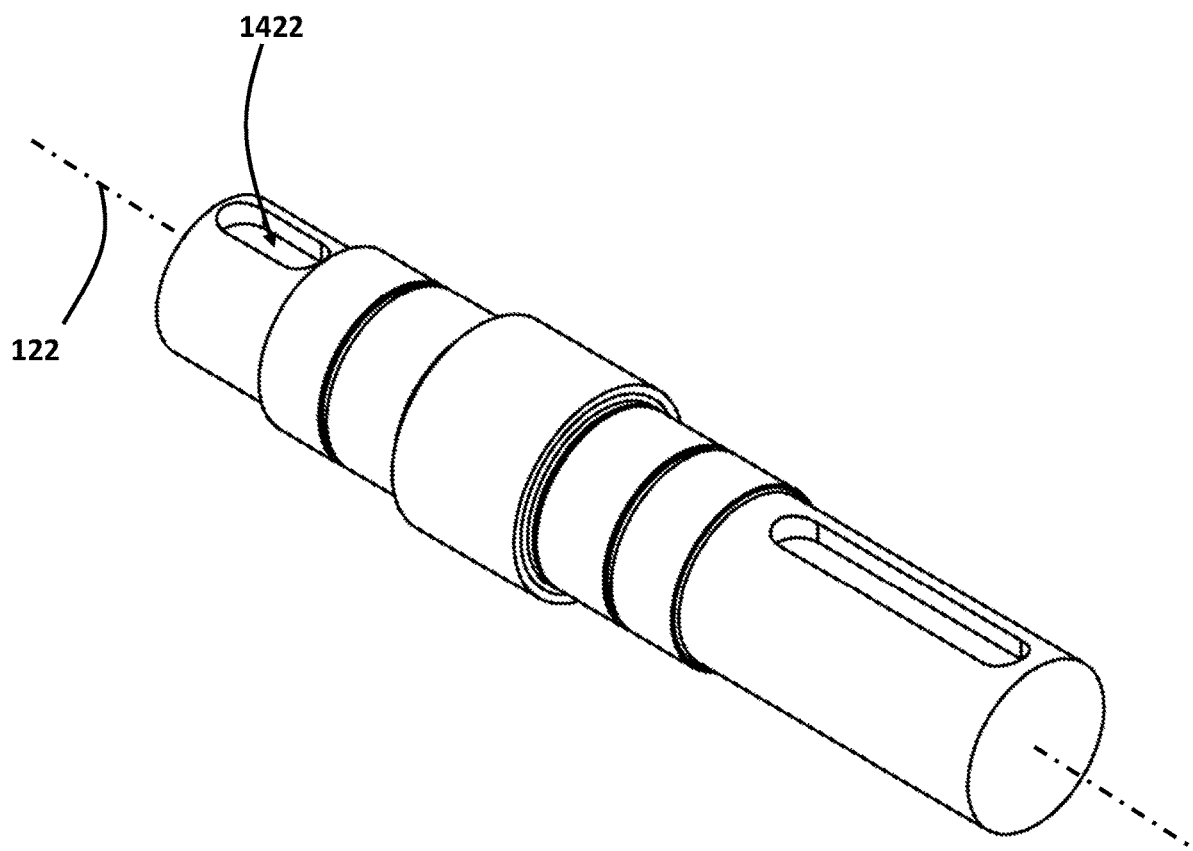
FIG. 2 illustrates a perspective view of a rotating shaft, consistent with one or more exemplary embodiments of the present disclosure.

FIG. 1A shows a section view of an axial flux motor 100, consistent with one or more exemplary embodiments of the present disclosure. FIG. 1B shows an exploded view of an axial flux motor 100, consistent with one or more exemplary embodiments of the present disclosure. As shown in FIG. 1A and FIG. 1B, in an exemplary embodiment, axial flux motor 100 may include a rotating shaft 102, a rotor assembly 104, and a stator assembly 106. FIG. 2 shows a perspective view of rotating shaft 102, consistent with one or more exemplary embodiments of the present disclosure. In an exemplary embodiment, rotating shaft 102 may be configured to rotate around a first axis 101. In an exemplary embodiment, first axis 101 may coincide a main longitudinal axis 122 of rotating shaft 102. In an exemplary embodiment, rotating shaft 102 may be used as an output of axial flux motor 100. In an exemplary embodiment, axial flux motor 100 may rotate rotating shaft 102. In an exemplary embodiment, rotation of rotating shaft 102 may be used for different applications of axial flux motor 100.

Figure 3A:
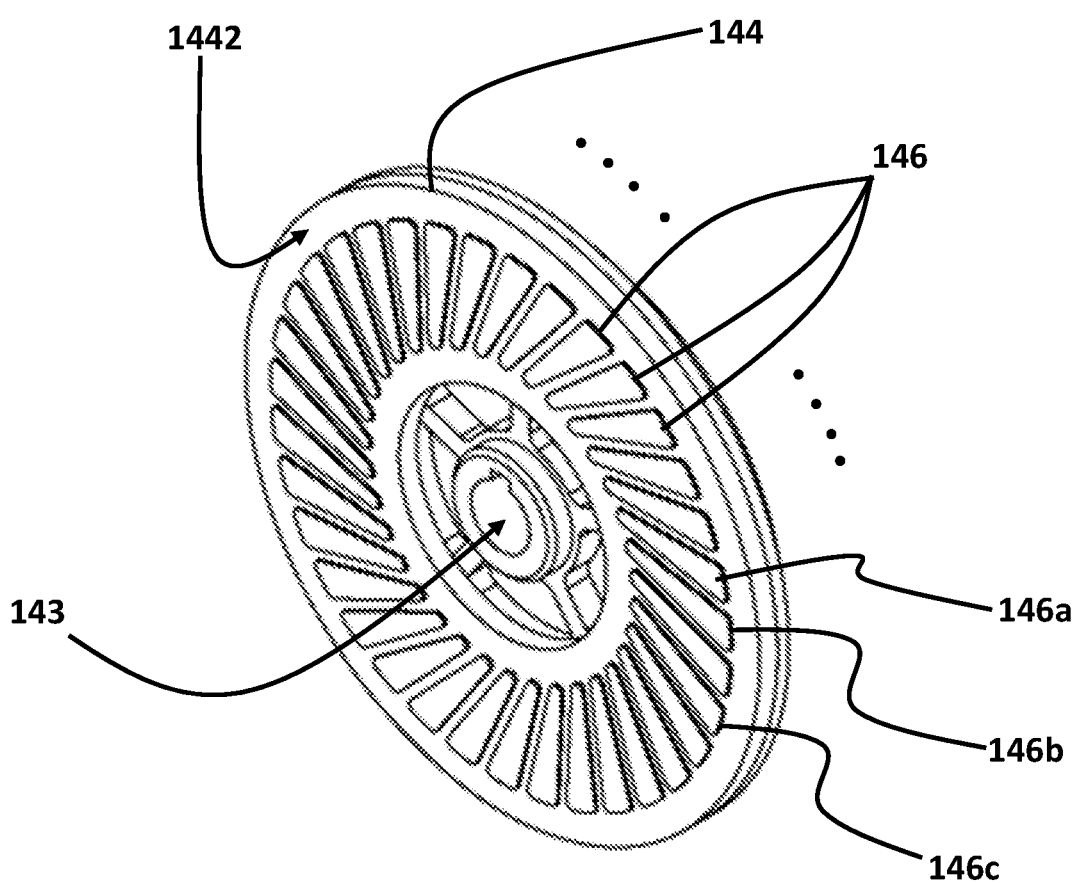
FIG. 3A illustrates a perspective view of a rotor assembly, consistent with one or more exemplary embodiments of the present disclosure.
Figure 3B:
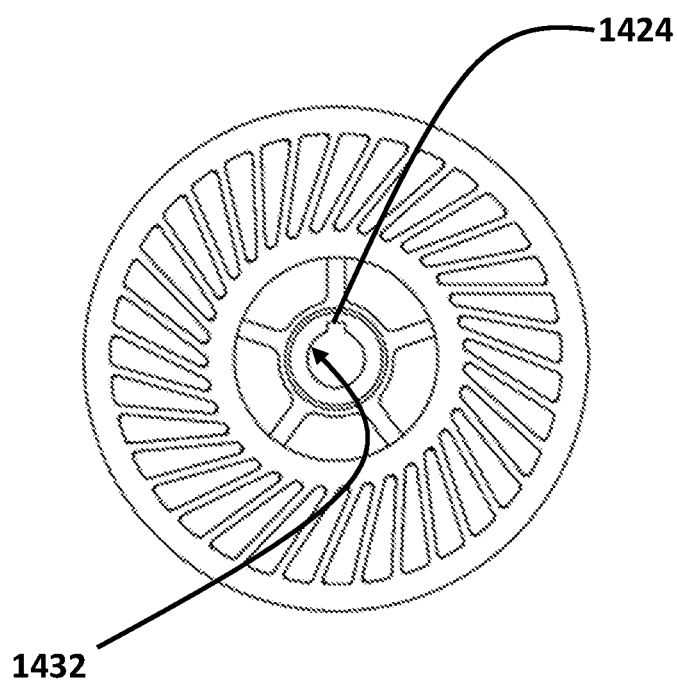
FIG. 3B illustrates a side view of a rotor assembly, consistent with one or more exemplary embodiments of the present disclosure.

FIG. 3A shows a perspective view of rotor assembly 104, consistent with one or more exemplary embodiments of the present disclosure. FIG. 3B shows a side view of rotor assembly 104, consistent with one or more exemplary embodiments of the present disclosure. In an exemplary embodiment, rotor assembly 104 may be mounted fixedly onto rotating shaft 102. In an exemplary embodiment, when rotor assembly 104 is mounted fixedly onto rotating shaft 102, it may mean that rotor assembly 104 is mounted onto rotating shaft 102 in such a way that any relative motion between rotor assembly 104 and rotating shaft 102 is prevented. In an exemplary embodiment, when rotor assembly 104 is mounted fixedly onto rotating shaft 102, rotation of rotor assembly 104 around first axis 122 may urge rotating shaft 102 to rotate around first axis 122 synchronously with rotor assembly 104. In an exemplary embodiment, when rotating shaft 102 rotates around first axis 122 synchronously with rotor assembly 104, it may mean that rotating shaft 102 and rotor assembly 104 rotate around first axis 122 in a same rotational direction and with a same speed.

In an exemplary embodiment, rotor assembly 104 may be mounted onto rotating shaft 102 by utilizing a key mechanism. In an exemplary embodiment, the key mechanism may include a first keyway 1422 and a second keyway 1424. In an exemplary embodiment, first keyway 1422 may be a slot that may be provided on rotating shaft 102. In an exemplary embodiment, second keyway 1424 may be a slot that may be provided on an inner surface 1432 of a connecting hole 143 of rotor assembly 104. In an exemplary embodiment, the key mechanism may further include a key (not shown in figures). In an exemplary embodiment, rotating shaft 102 may be inserted into connecting hole of rotor assembly 104 and the key may be inserted into first keyway 1422 and second keyway 1424. In an exemplary embodiment, when the key is inserted into first keyway 1422 and second keyway 1424, rotating shaft 102 and rotor assembly 104 may be engaged with each other. In an exemplary embodiment, when rotating shaft 102 and rotor assembly 104 are engaged with each other, rotation of rotor assembly 104 around first axis 122 may urge rotating shaft 102 to rotate around first axis 122 synchronously with rotor assembly 104. In an exemplary embodiment, rotor assembly 104 may include a rotor disc 144. In an exemplary embodiment, rotor assembly 104 may further include an electrical cage 1423 in induction motors or a plurality of permanent magnets that are not shown in current example. In an exemplary embodiment, plurality of rotor disc teeth 146 may include a first rotor disc tooth 146a, a second rotor disc tooth 146b, and a third rotor disc tooth 146c. Furthermore, plurality of rotor disc teeth 146 may include more rotor disc teeth in addition to first rotor disc tooth 146a, second rotor disc tooth 146b, and third rotor disc tooth 146c which are shown but bot labeled in FIG. 3A. In an exemplary embodiment, plurality of rotor disc teeth 146 may be attached to a first side 1442 of rotor disc 144. Rotor disc teeth 146 are created on rotor disc 144 and rotor cage 1423 is installed between these teeth. In an exemplary embodiment, rotor disc 144 may be made of a soft ferromagnetic material so that rotor disc 144 and may make a good passage for flux in axial flux motor 100. In an exemplary embodiment, the rotor cage 1423 may be made of low resistance materials like copper and aluminum as the inducted current path. In an exemplary embodiment, rotor assembly 104 may include permanent magnets as a synchronous machine or a cage design as an asynchronous machine depending on the machine type.

Figure 4:
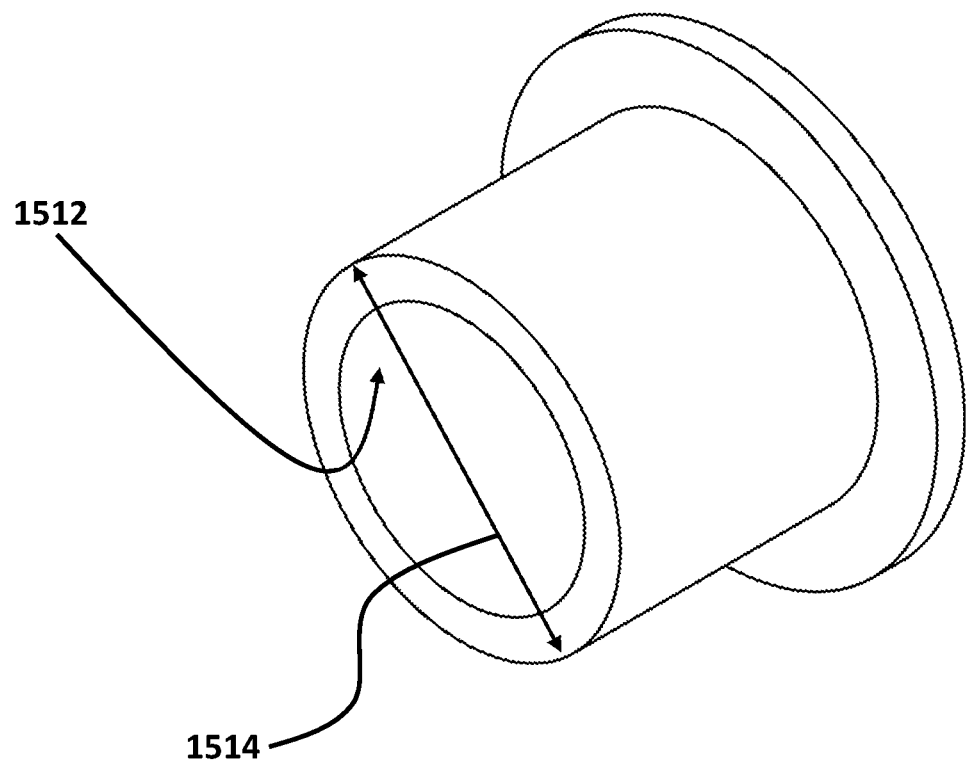
FIG. 4 illustrates a perspective view of a bearing housing, consistent with one or more exemplary embodiments of the present disclosure.

In an exemplary embodiment, stator assembly 106 may be mounted freely onto rotating shaft 102. In an exemplary embodiment, when stator assembly 106 is mounted freely onto rotating shaft 102, it may mean that stator assembly 106 is mounted onto rotating shaft 102 in such a way that when rotating shaft 102 rotates around first axis 122, stator assembly 106 remains stationary without any rotation around first axis 122. In an exemplary embodiment, axial flux motor 100 may further include a bearing housing 151 and a couple of bearings 152. FIG. 4 shows a perspective view of bearing housing 151, consistent with one or more exemplary embodiments of the present disclosure. In an exemplary embodiment, couple of bearings 152 may be fixedly attached to an inner surface 1512 of bearing housing 151. In an exemplary embodiment, rotating shaft 102 may be inserted into couple of bearings 152. In an exemplary embodiment, when rotating shaft 102 is inserted into couple of bearings 152 and couple of bearings 152 is fixedly attached to an inner surface 1512 of bearing housing 151, bearing housing 151 may be mounted freely onto rotating shaft 102. In other words, when rotating shaft 102 rotates around first axis 122, bearing housing 151 may remain stationary without any rotation around first axis 122. In an exemplary embodiment, stator assembly 106 may be fixedly attached to the first side of the supporting plate.

Figure 5:
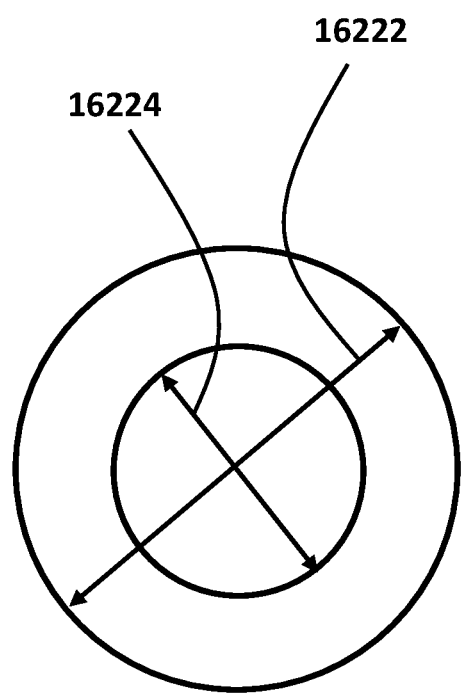
FIG. 5 illustrates a side view of a yoke, consistent with one or more exemplary embodiments of the present disclosure.
Figure 6A:
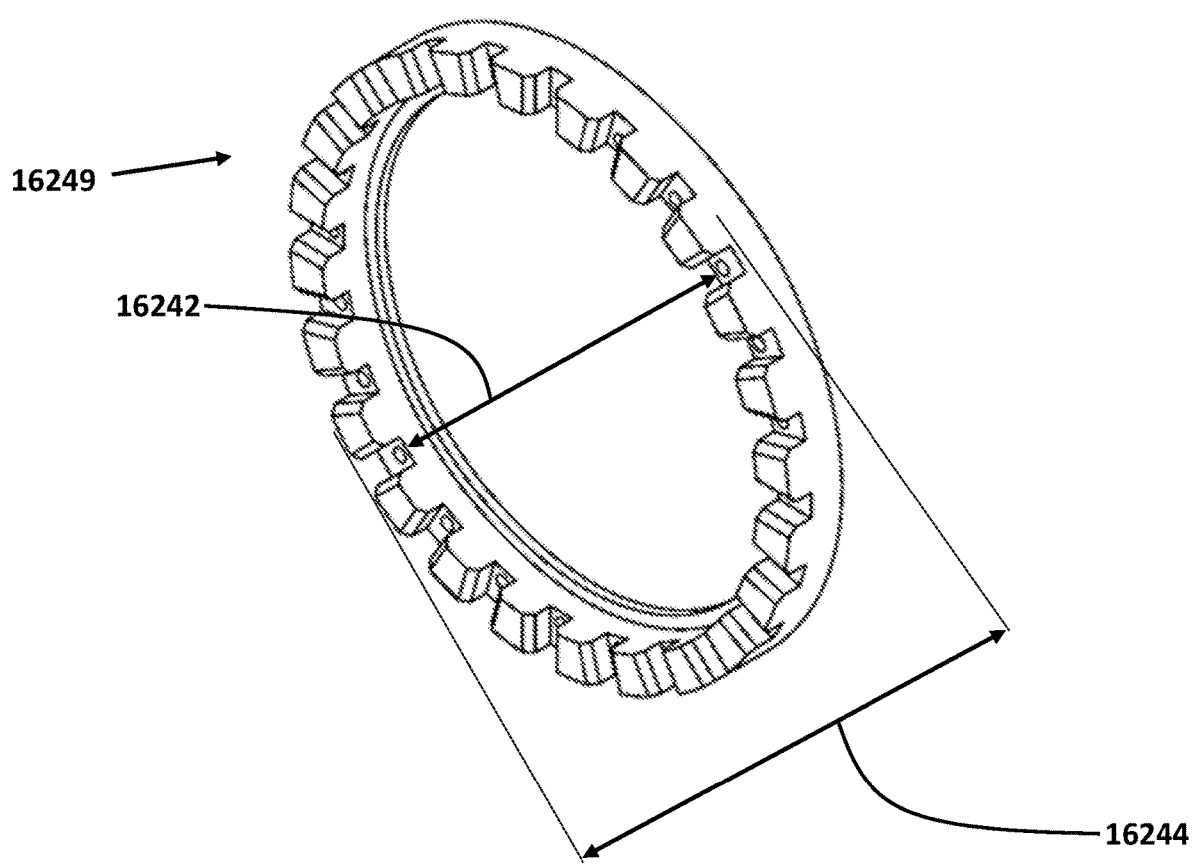
FIG. 6A illustrates a perspective view of an outer fixture, consistent with one or more exemplary embodiments of the present disclosure.
Figure 6B:
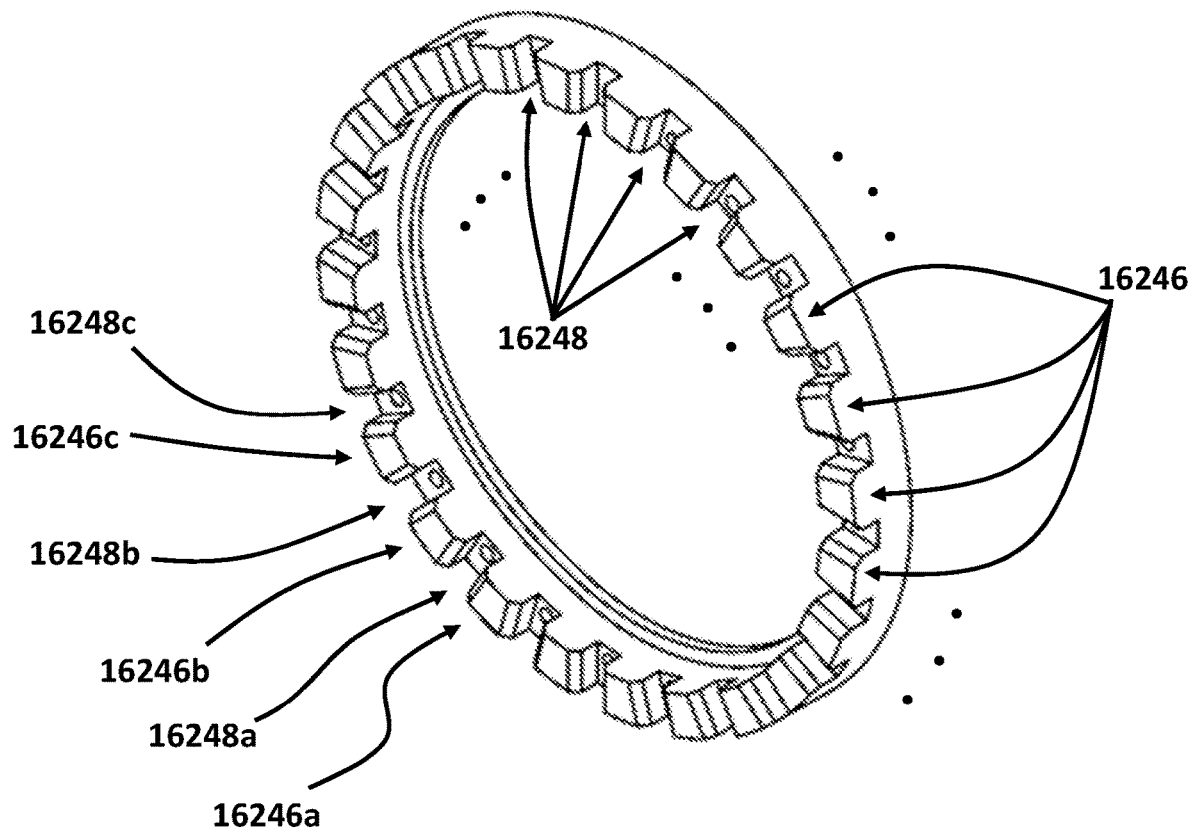
FIG. 6B illustrates a perspective view of an outer fixture, consistent with one or more exemplary embodiments of the present disclosure.
Figure 7:
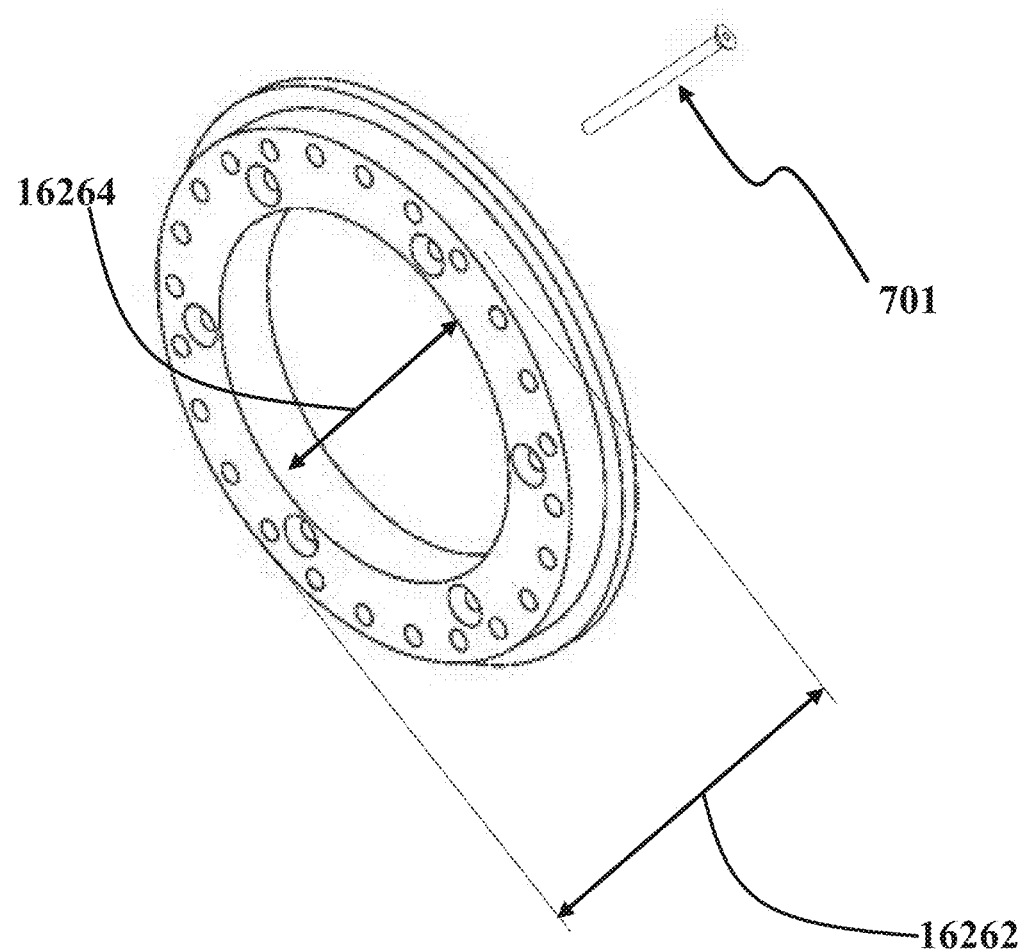
FIG. 7 illustrates a perspective view of an inner fixture, consistent with one or more exemplary embodiments of the present disclosure.

In an exemplary embodiment, stator assembly 106 may include a stator base 162. In an exemplary embodiment, stator base 162 may include a yoke 1622 that has a ring shape. In an exemplary embodiment, stator base 162 may further include an outer fixture 1624 and an inner fixture 1626. In an exemplary embodiment, yoke 1622 may be fitted between outer fixture 1624 and inner fixture 1626. In an exemplary embodiment, outer fixture 1624 and inner fixture 1626 may be nonmagnetic materials, such as aluminum, so that the flux tends to pass through the yoke. FIG. 5 shows a side view of yoke 1622, consistent with one or more exemplary embodiments of the present disclosure. FIG. 6A shows a perspective view of outer fixture 1624, consistent with one or more exemplary embodiments of the present disclosure. FIG. 6B shows a perspective view of outer fixture 1624, consistent with one or more exemplary embodiments of the present disclosure. FIG. 7 shows a perspective view of inner fixture 1626, consistent with one or more exemplary embodiments of the present disclosure. In an exemplary embodiment, inner fixture 1626 may include an outer diameter 16262 and an inner diameter 16264. In an exemplary embodiment, inner fixture 1626 may be with a screw 701. In an exemplary embodiment, an outer diameter 16222 of yoke 1622 may correspond to an inner diameter 16242 of outer fixture 1624. In an exemplary embodiment, an inner diameter 16224 of yoke 1622 may correspond to outer diameter 16262 of inner fixture 1626. In an exemplary embodiment, bearing housing 151 may be inserted into inner fixture 1626. In an exemplary embodiment, the bearing housing 151 is mounted on the central hole 174 of the supporting plate 107. In an exemplary embodiment, inner fixture 1626 may be installed around the bearing housing 151 on the supporting plate 107. In an exemplary embodiment, an inner diameter of the central hole 174 of the supporting plate 107 may correspond to an outer diameter 1514 of bearing housing 151.

In an exemplary embodiment, stator assembly 106 may further include a plurality of electromagnet assemblies 166. In an exemplary embodiment, plurality of electromagnet assemblies 166 may be attached to a first side 16226 of yoke 1622. In an exemplary embodiment, first side 16226 of yoke 1622 may face toward first side 1442 of rotor disc 144. In an exemplary embodiment, plurality of electromagnet assemblies 166 may be configured to create a magnetic field as electrical current flows through them. In an exemplary embodiment, plurality of electromagnet assemblies 166 may be configured to urge rotor assembly 104 to rotate around first axis 122. In an exemplary embodiment, it may be understood that a rotary magnetic field may be created with plurality of electromagnet assemblies 166 in stator and its interaction with rotor assembly 104 may urge rotor assembly 104 to rotate around first axis 122.

Figure 8A:
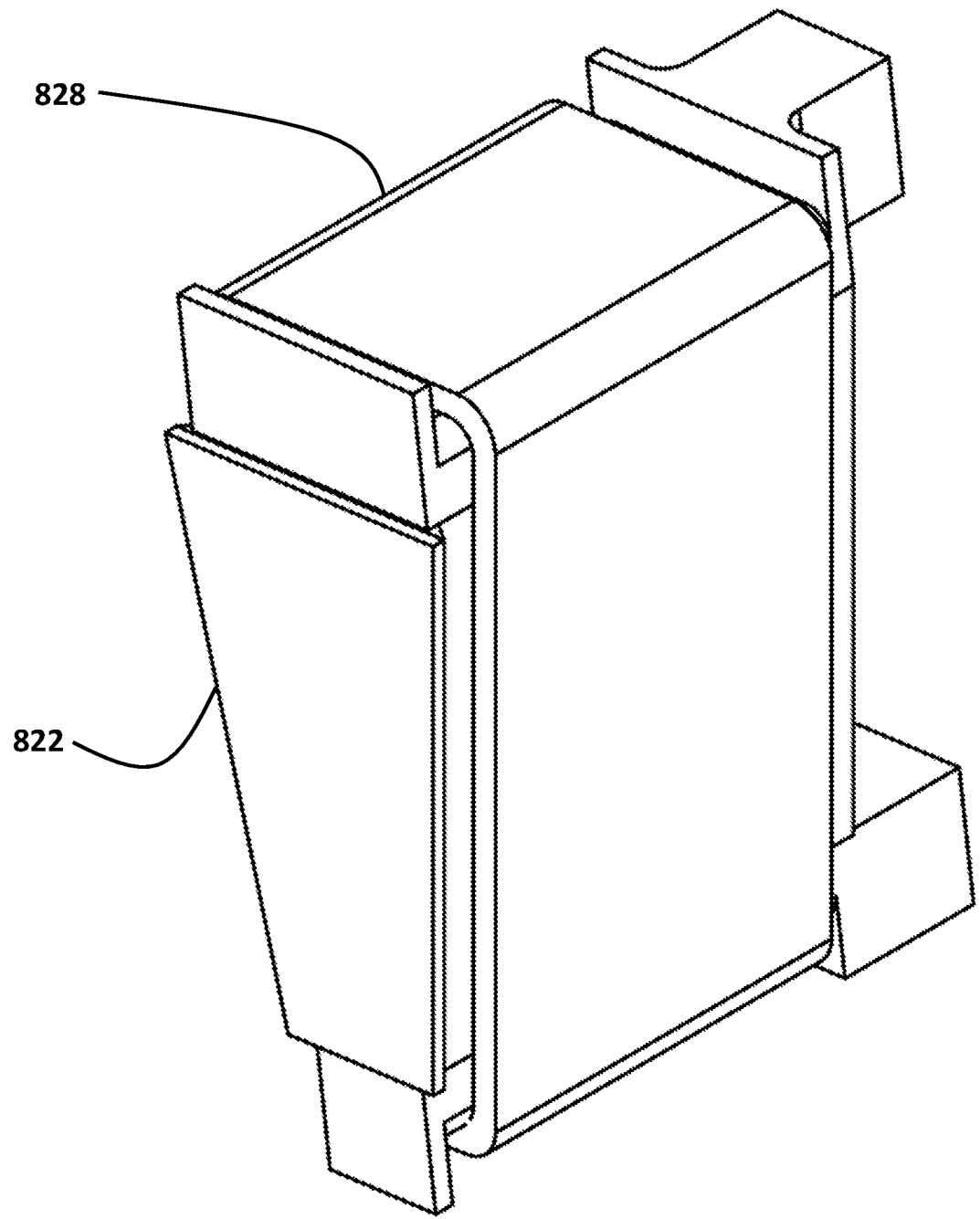
FIG. 8A illustrates a perspective view of an electromagnet assembly from a plurality of electromagnet assemblies, consistent with one or more exemplary embodiments of the present disclosure.
Figure 8B:
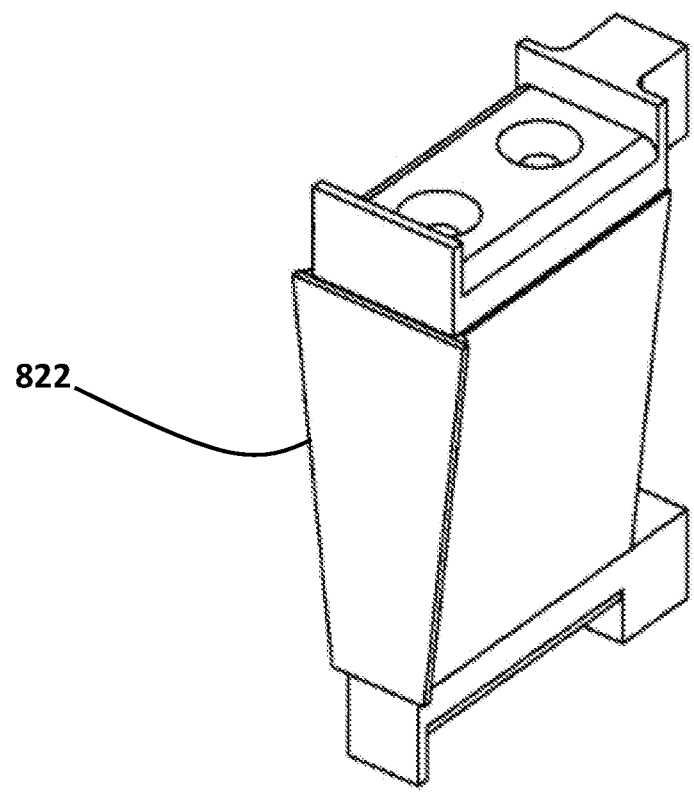
FIG. 8B illustrates another perspective view of the electromagnet assembly (coils are not depicted) from the plurality of electromagnet assemblies, consistent with one or more exemplary embodiments of the present disclosure.
Figure 8C:
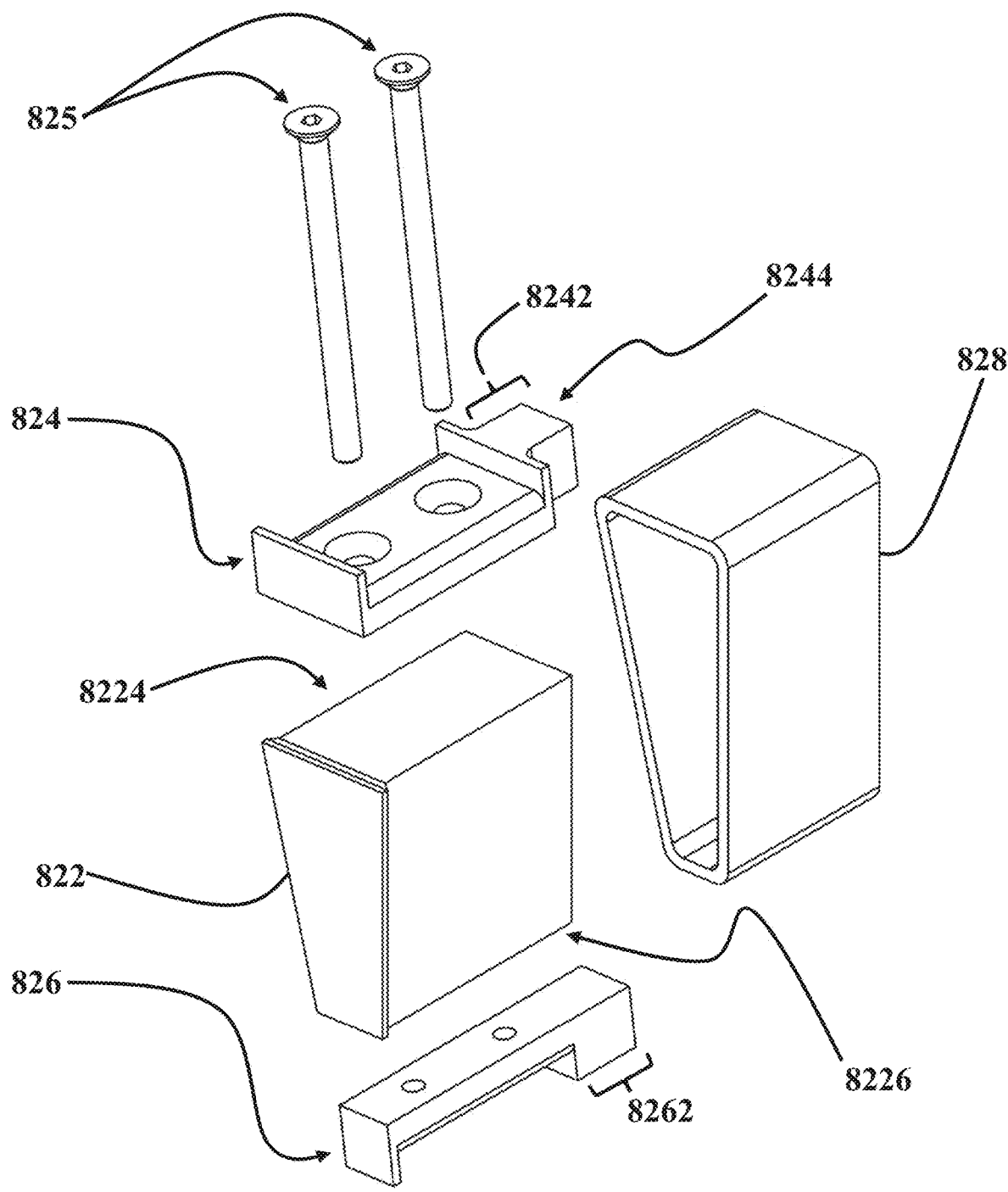
FIG. 8C illustrates an exploded view of an electromagnet assembly from a plurality of electromagnet assemblies, consistent with one or more exemplary embodiments of the present disclosure.
Figure 8D:
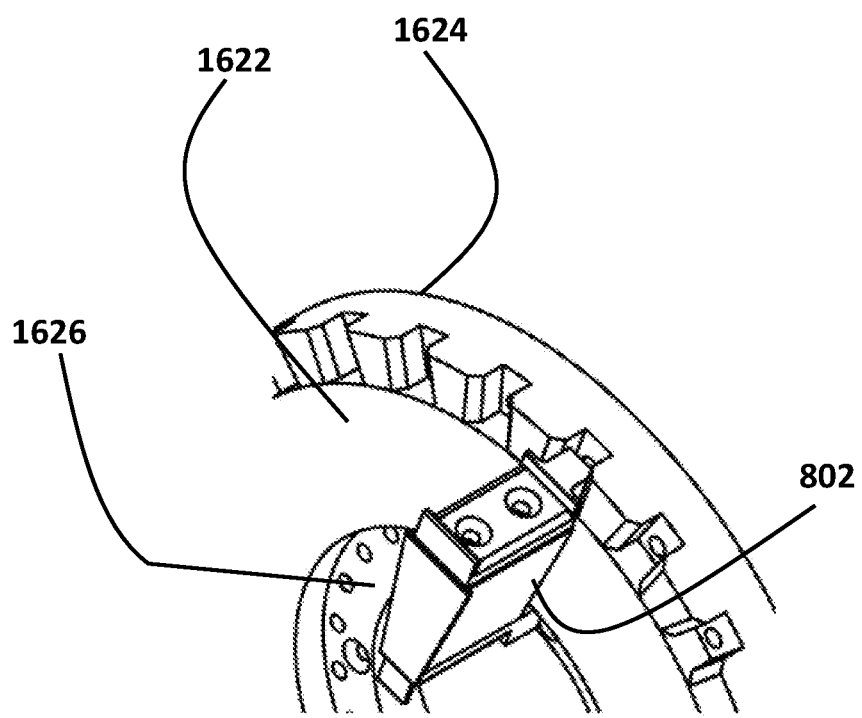
FIG. 8D illustrates a perspective view of an electromagnet assembly from a plurality of electromagnet assemblies in a scenario in which the electromagnet assembly is attached to a yoke, consistent with one or more exemplary embodiments of the present disclosure.
Figure 9A:
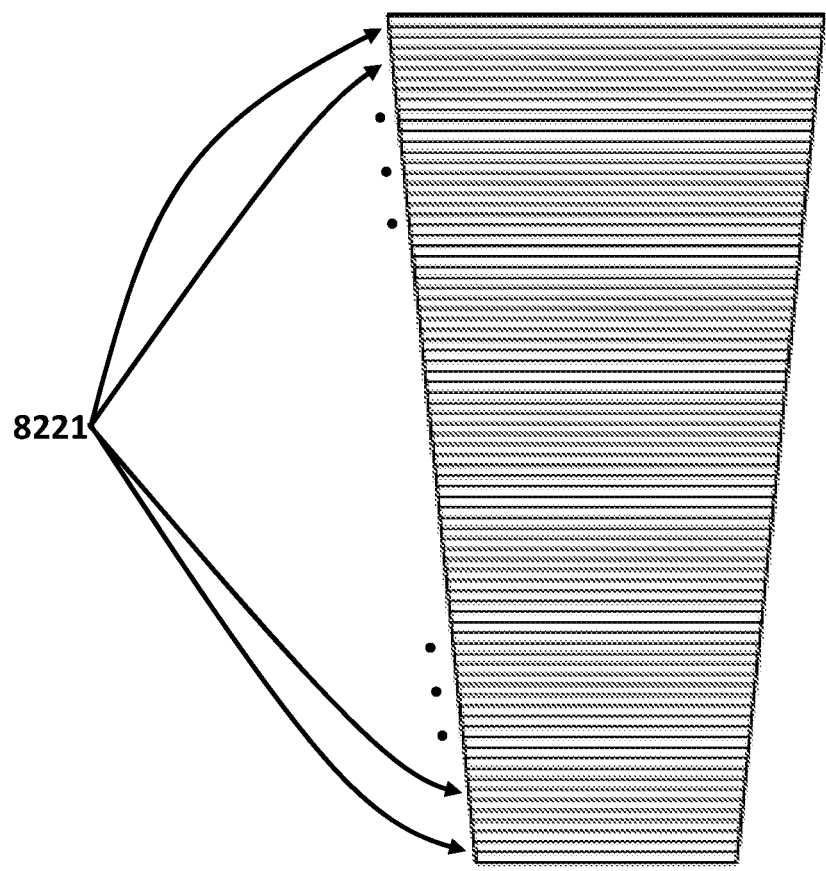
FIG. 9A illustrates a side view of a core, consistent with one or more exemplary embodiments of the present disclosure.
Figure 9B:
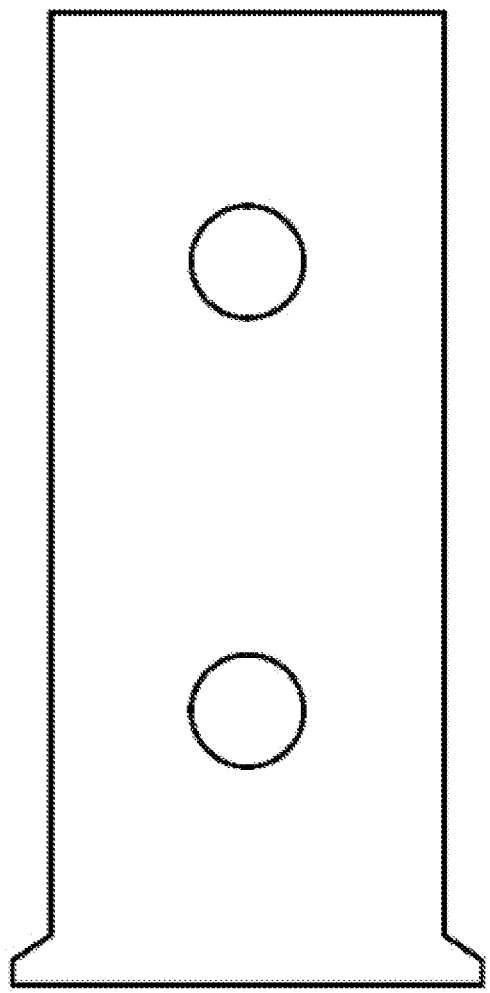
FIG. 9B illustrates a side view of a core layer from a plurality of core layers, consistent with one or more exemplary embodiments of the present disclosure.

FIG. 8A shows a perspective view of an electromagnet assembly 802 from plurality of electromagnet assemblies 166, consistent with one or more exemplary embodiments of the present disclosure. FIG. 8B shows another perspective view of electromagnet assembly 802 from plurality of electromagnet assemblies 166, consistent with one or more exemplary embodiments of the present disclosure. FIG. 8C shows an exploded view of electromagnet assembly 802 from plurality of electromagnet assemblies 166, consistent with one or more exemplary embodiments of the present disclosure. FIG. 8D shows a perspective view of electromagnet assembly 802 from plurality of electromagnet assemblies 166 in a scenario in which electromagnet assembly 802 is attached to yoke 1622, consistent with one or more exemplary embodiments of the present disclosure. As shown in FIG. 8A, FIG. 8B, and FIG. 8C, in an exemplary embodiment, electromagnet assembly 802 may include a core 822. FIG. 9A shows a side view of core 822, consistent with one or more exemplary embodiments of the present disclosure. As shown in FIG. 9A, in an exemplary embodiment, core 822 may include a plurality of core layers 8221 stacked onto each other. In an exemplary embodiment, plurality of core layers 8221 may be soft ferromagnetic material that may be covered on one or both sides with a thin layer of insulation. In an exemplary embodiment, this lamination method may decrease the eddy current effect. FIG. 9B illustrates a side view of a core layer 902 from plurality of core layers 8221, consistent with one or more exemplary embodiments of the present disclosure. In an exemplary embodiment, plurality of core layers 8221 may be similar in shape but different in size. In an exemplary embodiment, plurality of core layers 8221 may be stacked onto each other in such a way that each core layer from plurality of core layers 8221 is smaller than the upper core layer in plurality of core layers 8221. For example, area width of a core layer from plurality of core layers 8221 may be 0.9 of area width of the upper core layer in plurality of core layers 8221 stacked onto each other.

As further shown in FIG. 8A, FIG. 8B, and FIG. 8C, in an exemplary embodiment, electromagnet assembly 802 may further include a first fixture 824 and a second fixture 826. In an exemplary embodiment, first fixture 824 may be attached to a first end 8224 of core 822. In an exemplary embodiment, first fixture 824 may include a first securing part 8242 at one end 8244 of first fixture 824. In an exemplary embodiment, second fixture 826 may be attached to a second end 8226 of core 822. In an exemplary embodiment, second fixture 826 may include a second securing part 8262 at one end 8264 of second fixture 826. In an exemplary embodiment, a couple of connecting screws 825 may be used to secure core 822 between first fixture 824 and second fixture 826.

In an exemplary embodiment, electromagnet assembly 802 may further include a coil winding 828. In an exemplary embodiment, coil winding 828 may be wrapped around plurality of core layers 8221, first fixture 824, and second fixture 826. In an exemplary embodiment, coil winding 828 may be connected to an electric current. In an exemplary embodiment, when coil winding 828 is wrapped around plurality of core layers 8221, electromagnet assembly 802 may act as an electromagnet. In an exemplary embodiment, an electromagnet is a type of magnet in which the magnetic field may be produced by an electric current. The magnetic field disappears when the current is turned off. As shown in FIG. 8D, in an exemplary embodiment, electromagnet assembly 802 may be mounted onto yoke 1622 in such a way that yoke 1622 is secured between first securing part 8242 and second securing part 8262.

As further shown in FIG. 6B, in an exemplary embodiment, outer fixture 1624 may include a plurality of teeth 16246 and a plurality of intercostal spaces 16248. In an exemplary embodiment, plurality of teeth 16246 and plurality of intercostal spaces 16248 may be arranged alternately on a first side 16249 of outer fixture 1624. In an exemplary embodiment, plurality of teeth 16246 may include a first tooth 16246*a*, a second tooth 16246*b*, and a third tooth 16246*c*. In an exemplary embodiment, plurality of teeth 16246 may include more teeth in addition to first tooth 16246*a*, second tooth 16246*b*, and third tooth 16246*c* which are shown but not labeled in FIG. 6B. In an exemplary embodiment, plurality of intercostal spaces 16248 may include a first intercostal space 16248*a*, a second intercostal space 16248*b*, and a third intercostal space 16248*c*. In an exemplary embodiment, plurality of intercostal spaces 16248 may include further intercostal spaces in addition to first intercostal space 16248*a*, second intercostal space 16248*b*, and third intercostal space 16248*c* which are shown but not labeled in FIG. 6B. In an exemplary embodiment, first side 16249 of outer fixture 1624 may face toward first side 1442 of rotor disc 144. As shown in FIG. 8D, in an exemplary embodiment, electromagnet assembly 802 may be mounted onto yoke 1622 in such a way that first securing part 8242 is secured inside an intercostal space from plurality of intercostal spaces 16248. In an exemplary embodiment, second securing part 8262 may be attached to inner fixture 1626 by utilizing screw 701. In an exemplary embodiment, each electromagnet assembly from plurality of electromagnet assemblies 166 may be associated with a respective intercostal space from plurality of intercostal spaces 16248. In an exemplary embodiment, a respective first securing part of each electromagnet assembly from plurality of electromagnet assemblies 166 may be secured into a respective intercostal space from plurality of intercostal spaces 16248.

Figure 10:
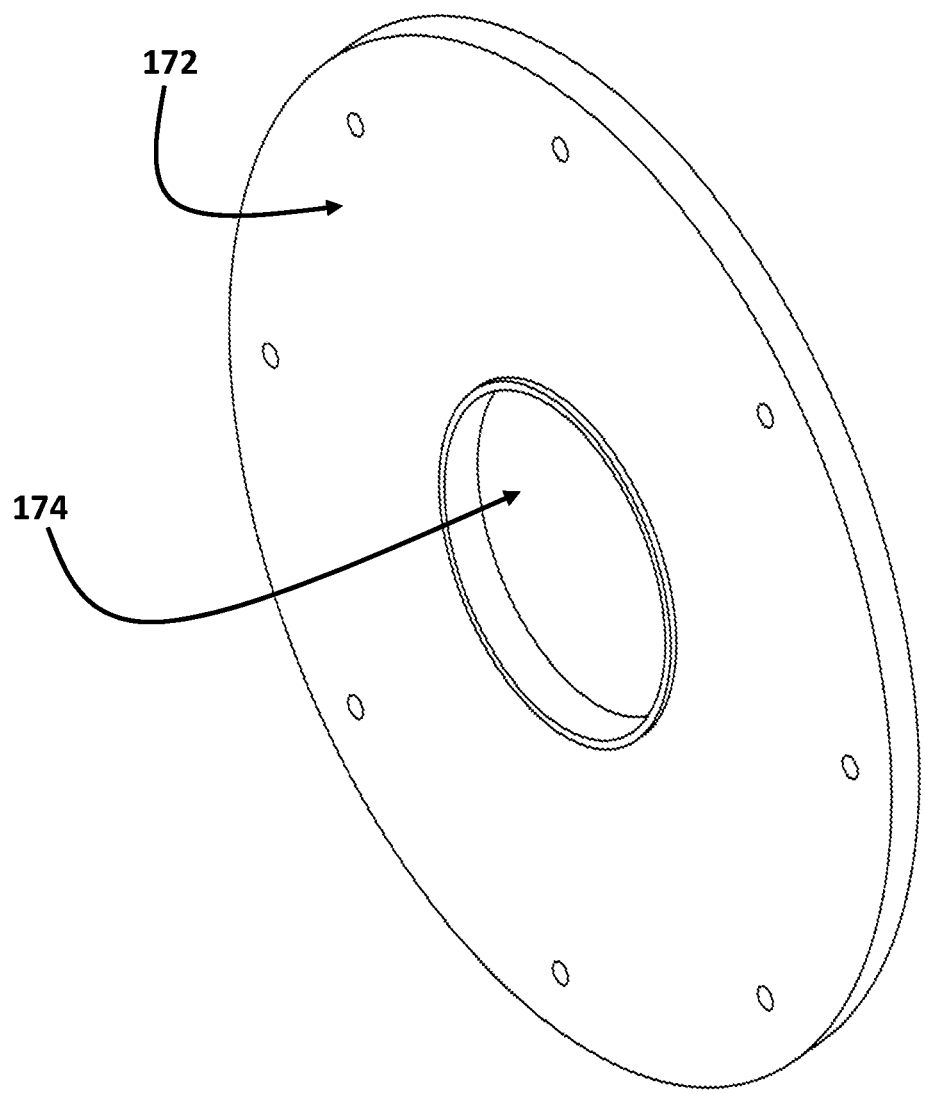
FIG. 10 illustrates a perspective view of a supporting plate, consistent with one or more exemplary embodiments of the present disclosure.

In an exemplary embodiment, axial flux motor 100 may further include a supporting plate 107. FIG. 10 shows a perspective view of supporting plate 107, consistent with one or more exemplary embodiments of the present disclosure. In an exemplary embodiment, outer fixture 1624 and inner fixture 1626 may be attached to a first side 172 of supporting plate 107. In an exemplary embodiment, supporting plate 107 may include a central hole 174 at a center of supporting plate 107. In an exemplary embodiment, bearing housing 151 may be installed inside central hole 174 of supporting plate 107.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. An axial flux motor, comprising:
  a rotating shaft, the rotating shaft configured to rotate around a first axis, the first axis coinciding with a main longitudinal axis of the rotating shaft;
  a rotor assembly mounted fixedly onto the rotating shaft, the rotor assembly configured to rotate around the first axis, the rotor assembly comprising:
    a rotor disc; and
    a plurality of rotor disc teeth provided on a first side of the rotor disc; and
  a stator assembly mounted freely onto the rotating shaft, the stator assembly comprising:
    a stator base comprising:
      a yoke with a ring shape;
      an outer fixture with a ring shape, an inner diameter of the outer fixture corresponding to an outer diameter of the yoke, the yoke secured inside the outer fixture, the outer fixture comprising a plurality of teeth and a plurality of intercostal spaces arranged alternately on a first side of the outer fixture, a first securing part configured to be secured inside an intercostal space from the plurality of intercostal spaces; and an inner fixture with a ring shape, an outer diameter of the inner fixture corresponding to an inner diameter of the yoke, the inner fixture secured inside the yoke, a second securing part attached to the inner fixture by utilizing a screw;

a plurality of electromagnet assemblies attached onto a first side of the yoke, the first side of the yoke facing toward the first side of the rotor disc, the plurality of electromagnet assemblies configured to urge the rotor assembly to rotate around the first axis due to a rotating magnetic field with the plurality of electromagnet assemblies and its interaction with the rotor, an electromagnet assembly from the plurality of electromagnet assemblies comprising:

a core comprising a plurality of core layers stacked onto each other;

a first fixture attached to a first end of the core, the first fixture comprising the first securing part at one end of the first fixture;

a second fixture attached to a second end of the core, the second fixture comprising the second securing part at one end of the second fixture;

a coil winding wound around the plurality of core layers, the first fixture, and the second fixture;

a couple of connecting screws, the couple of connecting screws configured to secure the plurality of core layers between the first fixture and the second fixture responsive to the couple of connecting screws being fastened into the first fixture and the second fixture; and wherein the yoke is configured to be secured between the first fixture and the second fixture;

a supporting plate, the inner fixture and the outer fixture attached to a first side of the supporting plate; and a bearing housing mounted on the supporting plate, bearings disposed between the rotating shaft and the bearing housing.

2. An axial flux motor, comprising:

a rotating shaft, the rotating shaft configured to rotate around a first axis;

a rotor assembly mounted fixedly onto the rotating shaft, the rotor assembly configured to rotate around the first axis, the rotor assembly comprising:

a rotor disc; and a plurality of rotor disc teeth provided on a first side of the rotor disc; and a stator assembly mounted freely onto the rotating shaft, the stator assembly comprising:

a stator base comprising a yoke with a ring shape;

a plurality of electromagnet assemblies attached onto a first side of the yoke, the first side of the yoke facing toward the first side of the rotor disc, the plurality of electromagnet assemblies configured to urge the rotor assembly to rotate around the first axis due to a rotating magnetic field with the plurality of electromagnet assemblies and its interaction with the rotor, an electromagnet assembly from the plurality of electromagnet assemblies comprising:

a core comprising a plurality of core layers stacked onto each other;

a first fixture attached to a first end of the core, the first fixture comprising a first securing part at one end of the first fixture;

a second fixture attached to a second end of the core, the second fixture comprising a second securing part at one end of the second fixture; and a coil winding wound around the plurality of core layers, the first fixture, and the second fixture, wherein the yoke is configured to be secured between the first fixture and the second fixture.

3. The axial flux motor of claim 2, wherein the stator base further comprises an outer fixture with a ring shape, an inner diameter of the outer fixture corresponding to an outer diameter of the yoke, the yoke secured inside the outer fixture, the outer fixture comprising a plurality of teeth and a plurality of intercostal spaces arranged alternately on a first side of the outer fixture, the first securing part configured to be secured inside an intercostal space from the plurality of intercostal spaces.

4. The axial flux motor of claim 3, wherein the stator base further comprises an inner fixture with a ring shape, an outer diameter of the inner fixture corresponding to an inner diameter of the yoke, the inner fixture secured inside the yoke, the second securing part attached to the inner fixture by utilizing a screw.

5. The axial flux motor of claim 4, wherein each electromagnet assembly further comprises a couple of connecting screws, the couple of connecting screws configured to secure the plurality of core layers between the first fixture and the second fixture responsive to the couple of connecting screws being fastened into the first fixture and the second fixture.

6. The axial flux motor of claim 5, further comprising a supporting plate, the inner fixture and the outer fixture attached to a first side of the supporting plate.

7. The axial flux motor of claim 6, further comprising a bearing housing mounted on the supporting plate, bearings disposed between the rotating shaft and the bearing housing.

8. The axial flux motor of claim 7, wherein the supporting plate is attached fixedly to the bearing housing.

9. The axial flux motor of claim 8, wherein the supporting plate comprises a central hole at a center of the supporting plate, the bearing housing disposed inside the central hole of the supporting plate.

10. The axial flux motor of claim 9, wherein the first axis coincides with a main longitudinal axis of the rotating shaft.

11. The axial flux motor of claim 10, wherein the yoke is made of an electrical belt, the electrical belt wound around a base.

* * * * *